US010324592B2

United States Patent
Campbell et al.

(10) Patent No.: US 10,324,592 B2
(45) Date of Patent: *Jun. 18, 2019

(54) SLICER ELEMENTS FOR FILTERING TABULAR DATA

(71) Applicant: Microsoft Technology Licensing, LLC, Redmond, WA (US)

(72) Inventors: Johnny Sterling Campbell, Renton, WA (US); Jenefer Monroe, Seattle, WA (US); Konrad Tupaj, Kirkland, WA (US); Amarinder Singh Grewal, Redmond, WA (US); Robert George Hawking, Seattle, WA (US); Allan Folting, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/222,842

(22) Filed: Jul. 28, 2016

(65) Prior Publication Data

US 2016/0334955 A1    Nov. 17, 2016

Related U.S. Application Data

(63) Continuation of application No. 13/286,125, filed on Oct. 31, 2011, now Pat. No. 9,411,797.

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/04847* (2013.01);
(Continued)

(58) Field of Classification Search
CPC .. G06F 3/0482; G06F 3/04886; G06F 17/245; G06F 17/246; G06F 3/0483
See application file for complete search history.

(56) References Cited

U.S. PATENT DOCUMENTS 7,334,185 B2    2/2008    Bletchley et al.
7,519,585 B2    4/2009    Kenney
(Continued)

FOREIGN PATENT DOCUMENTS

TW    201040754    11/2010

OTHER PUBLICATIONS

Anonymous, How to use Excel Mobile on touch screen devices, Feb. 23, 2007, Smartphone & Pocket PC magazine retrieved from http://www.smartphonemag.com/cms/node/473, pp. 1-2.*
(Continued)

*Primary Examiner* — Scott T Baderman
*Assistant Examiner* — Seung Woon Jung

(57) ABSTRACT

Slicers are configured to filter tabular data arranged in columns. A user may use the slicers to filter tabular data from a client application and/or a server based application/service. Slicers may be created for one or more columns and for all/portion of the tabular data within a column. Selection of a slicer element filters the associated tabular data and updates a display of the other slicers. Interaction with the slicers may also update other user interface controls that filter the tabular data (e.g. selecting a slicer element changes a value of a filtering setting in a drop down menu and/or selecting the filtering setting in the drop down menu changes a state of a slicer element). A slicer element may be associated with other objects in the spreadsheet and/or included within one or more functions of a spreadsheet.

18 Claims, 12 Drawing Sheets

(51) Int. Cl.
    *G06F 3/0484*    (2013.01)
    *G06F 3/0488*    (2013.01)
    *G06F 17/24*    (2006.01)
    *G06F 9/451*    (2018.01)

(52) U.S. Cl.
    CPC .......... *G06F 3/04886* (2013.01); *G06F 9/451* (2018.02); *G06F 17/245* (2013.01); *G06F 17/246* (2013.01)

(56) References Cited

U.S. PATENT DOCUMENTS

| | | | |
|---|---|---|---|
| 9,411,797 B2 | 8/2016 | Campbell | |
| 2006/0036568 A1* | 2/2006 | Moore | G06F 17/30126 |
| 2006/0129914 A1* | 6/2006 | Ellis | G06F 17/246 |
| | | | 715/275 |
| 2006/0167924 A1 | 7/2006 | Bradlee | |
| 2009/0007188 A1 | 1/2009 | Omernick | |
| 2009/0282324 A1 | 11/2009 | Patel | |
| 2009/0282325 A1 | 11/2009 | Radakovitz | |
| 2010/0083092 A1 | 4/2010 | Schuller | |
| 2010/0295805 A1 | 11/2010 | Shin et al. | |
| 2011/0087954 A1 | 4/2011 | Dickerman et al. | |
| 2011/0283176 A1* | 11/2011 | Zulian | G06F 17/246 |
| | | | 715/212 |
| 2012/0047469 A1 | 2/2012 | Chelaru et al. | |
| 2013/0013993 A1* | 1/2013 | Oh | G06F 17/5009 |
| | | | 715/212 |
| 2013/0111320 A1 | 5/2013 | Campbell | |

OTHER PUBLICATIONS

Debra Dalgleish, Add Filter Markers in Excel Pivot Table, Nov. 19, 2010, Contextures Blog, 4 pages.*
David McRitchie, Filter Test, AutoFilter and Hidden Rows_Columns, Jul. 18, 2005, 2 pages.*
PCT International Search Report in PCT/US2012/061239, dated Feb. 28, 2013, 10 pages.
Sackett, Larry, "MDX Reporting and Analytics with SAP NetWeaver BW", available at: http://www.sap-press.de/download/dateien/1928/sappress_mdx_reporting_pdf, Sep. 19, 2011, 28 pages.
SAS "Multidimensional Analysis with SAS: An Introduction and Overview", available at: http://www.sas.com/offices/?europe/uk/downloads/olap.pdf, Sep. 19, 2011, 32 pages.
Taiwanese Office Action in 101137979, dated Jul. 7, 2016, 12 pages.
U.S. Appl. No. 13/286,125, Amendment and Response filed Apr. 21, 2014, 10 pages.
U.S. Appl. No. 13/286,125, Amendment and Response filed Dec. 16, 2014, 11 pages.
U.S. Appl. No. 13/286,125, Amendment and Response filed Jan. 29, 2016, 10 pages.
U.S. Appl. No. 13/286,125, Notice of Allowance dated Apr. 5, 2016, 8 pages.
U.S. Appl. No. 13/286,125, Office Action dated Oct. 21, 2013, 19 pages.
U.S. Appl. No. 13/286,125, Office Action dated Jul. 16, 2014, 23 pages.
U.S. Appl. No. 13/286,125, Office Action dated Jul. 30, 2015, 26 pages.
"Microsoft Business Intelligence", available at: http://www.macaw.nl/upload/pdf/200604%20-%20Microsoft%20BIGuide.pdf, Apr. 2006, 62 pages.
"What's New in Excel 2010", available at: http://office.microsoft.com/en-us/excel-help/what-s-new-in-excel-2010- HA010369709.aspx, Sep. 19, 2011, 16 pages.
Abbot Katz, "Excel 2010 Made Simple", Jun. 1, 2011, pp. 2, 130, 242-247.
Akiko Kitami, "Excel—first data analysis—" Gijutsu Hyoron Publishing Co., Ltd., first edition, Jan. 25, 2011, pp. 86-88.
Chinese Notice on Grant of Patent for Invention in 201210423010.7, dated Sep. 29, 2015, 4 pages.
Chinese Office Action in 201210423010.7, dated Mar. 23, 2015, 10 pages.
COGNOS, "COGNOS8 Business Intelligence", available at: http://www.smith.edu/tara/cognos/documents/Report_Studio_Users_GuiDe.pdf, Sep. 19, 2011, 458 pages.
European Communication in 12846203.3, dated Aug. 5, 2015, 7 page.
European Search Report in 12846203.3, dated Aug. 5, 2015, 9 pages.
Japanese Office Action in 2014-539977, dated Jul. 15, 2016, 6 pages.
Javaid, U. "Insert slicer in pivot tables & charts—Excel 2010", MS Office Articles, http://www.addictivetips.com/microsoft-office/excel-2010-insert-slicer-in-pivot-tables-charts, Mar. 13, 2010, 3 pages.
Josh Clark, "Tapworthy—Designing Great iPhone Apps—" O'Reilly, first edition, Jan. 11, 2012, pp. 222-223.
Microsoft Use slicer to filter PivotTable data, http://support.office.com/en-us/article/Use-slicers-to-filter-pivottable-data-2491966b-a9d5-4b0f-b31a-12651785d29d, Jun. 10, 2010, 1 page.
Oracle, "Hyperion Interactive Reporting—System 9", available at: http://download.oracle.com/docs/cd/E10530_01/doc/epm.931/ir_developer_vol1.pdf, Sep. 19, 2011, 156 pages.
Taiwanese Notice of Allowance in 101137979, dated Sep. 29, 2016, 4 pages.
"Office Action Issued in Japanese Patent Application No. 2014-539977", dated Mar. 8, 2017, 6 Pages.
Inoue, Yohichi, "Very Functional Accounting Record—Excel 2010/2007/2003", Published by Shuwa System Co., Ltd, Oct. 10, 2011, pp. 43-45.
PCT International Preliminary Report on Patentability in PCT/US2012/061239, dated May 15, 2014, 7 pages.
"Office Action Issued in European Patent Application No. 12846203.3", dated Aug. 3, 2018, 5 Pages.
"Office Action Issued in Korean Patent Application No. 10-2014-7011659", dated Feb. 15, 2019, 5 Pages.

* cited by examiner

SLICER ELEMENTS FOR FILTERING TABULAR DATA

CROSS-REFERENCE TO RELATED APPLICATIONS

This application is a continuation of U.S. patent application Ser. No. 13/286,125, filed on Oct. 31, 2011, entitled SLICER ELEMENTS FOR FILTERING TABULAR DATA, the disclosure of which is hereby incorporated by reference herein in its entirety.

BACKGROUND

Tabular data is commonly displayed in applications, such as spreadsheet applications. A user may filter the tabular data to change the currently viewed data. For example, a user may filter out one or more rows/columns of the tabular data and/or show data that meets certain conditions. The filtering user interface, however, can be unintuitive and difficult for a user to use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Slicers are configured to filter tabular data arranged in columns. A user may use the slicers to filter tabular data associated with a client application and/or server based application/service. Slicers may be created for one or more columns and for all/portion of the tabular data within a column. For example, a user may select one or more columns (all/portion of the column) of tabular data for which they would like to use slicers. In response to the selection, slicer elements are created for unique values within each of the selected portions for each of the selected columns. The slicers may also be automatically generated (e.g. generate slicers for each column of tabular data). Selection of a slicer element filters the associated tabular data and updates a display of the other slicers. For example, selection of a slicer element may cause another slicer and/or slicer element to be removed from the display or shown differently (e.g. greyed out) since that slicer does not have any data to filter after the selection of the slicer. Interaction with the slicers may also update other user interface controls that filter the tabular data (e.g. selecting a slicer element changes a value of a filtering setting in a drop down menu and/or selecting the filtering setting in the drop down menu changes a state of a slicer element). A slicer element may be associated with other objects in the spreadsheet and/or included within one or more functions of a spreadsheet. Slicers may be configured to filter by hiding rows in the spreadsheet and/or by changing the query causing less data to be returned from the data source to the spreadsheet. Automatic updates of slicers may be automatically turned off in response to updates of the slicers that may take a long period of time to complete (e.g. longer than 300 ms).

DETAILED DESCRIPTION

Figure 1:
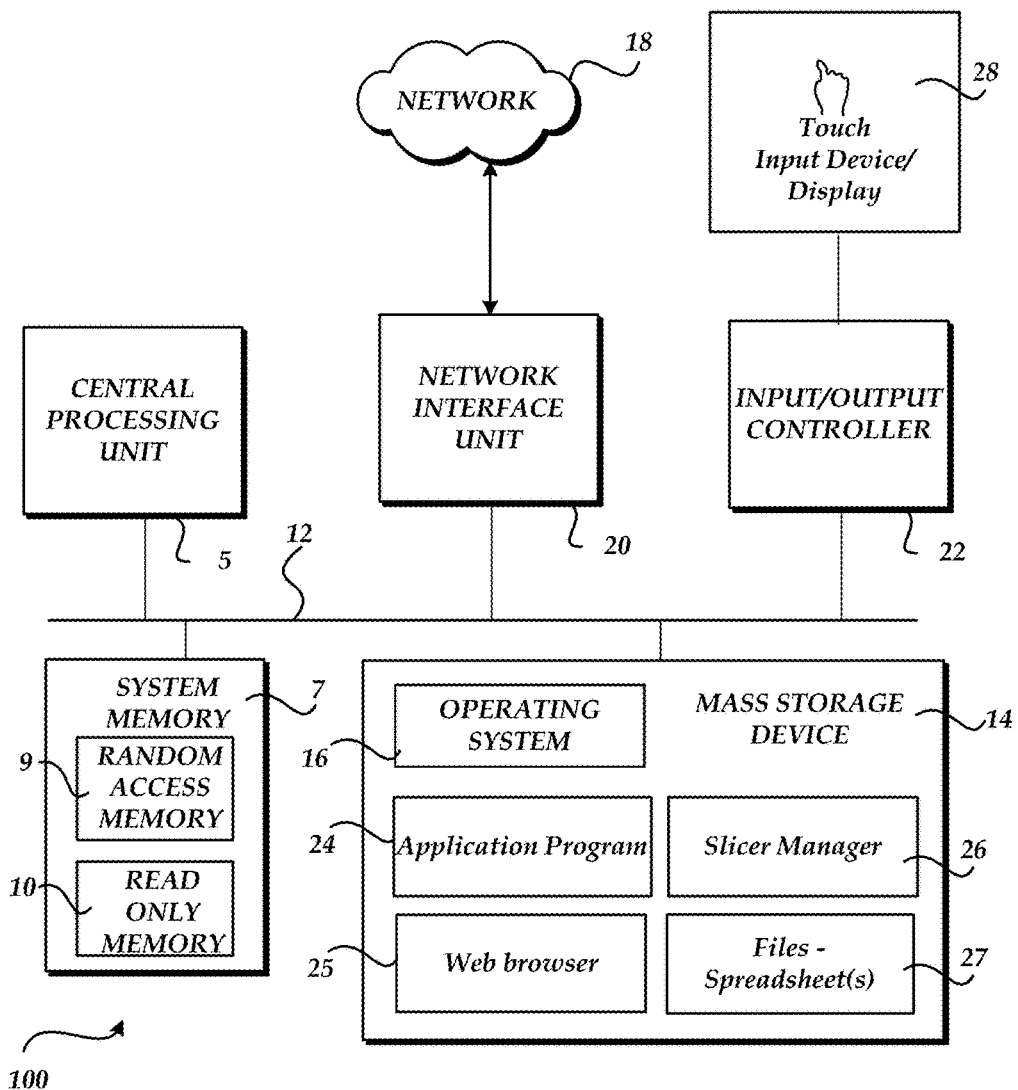
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a mobile computing device (e.g. smartphone, notebook, tablet . . . ) or desktop computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program(s) 24 such as a spreadsheet application and/or other application that works with tabular data, Web browser 25, files 27 (e.g. spreadsheets) and slicer manager 26 which will be described in greater detail below. The Web browser 25 is operative to request, receive, render, and provide interactivity with electronic content, such as Web pages, videos, documents, and the like. According to an embodiment, the Web browser comprises the INTERNET EXPLORER Web browser application program from MICROSOFT CORPORATION.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a touch input device 28. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device 28 may also act as a display. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS 7® operating system from MICROSOFT CORPORATION of Redmond, Wash. According to one embodiment, the operating system is configured to include support for touch input device 23. According to another embodiment, slicer manager 26 may be utilized to process some/all of the touch input that is received from touch input device 28.

The mass storage device 14 and RAM 9 may also store one or more program modules. In particular, the mass storage device 14 and the RAM 9 may store one or more application programs 24, such as a spreadsheet application. In conjunction with the operation of the application, slicer manager 26 is used to configure and use slicers to filter tabular data. Slicer manager 26 may be configured as an application/process and/or as part of a cloud based multi-tenant service that provides resources (e.g. services, data . . . ) to different tenants (e.g. MICROSOFT OFFICE 365, MICROSOFT SHAREPOINT ONLINE). Generally, slicer manager 26 is configured to process input that is used for the configuration and use of slicers to filter tabular data. Slicers are configured to filter tabular data arranged in columns. The slicers are not limited to data that is associated with a pivot table. Instead, the tabular data may be any tabular data. For example, the tabular data that is associated with a slicer may be associated with data from a column within a spreadsheet, a data feed, a file, and the like. A user may use the slicers to filter tabular data from a client application and/or a server based application/service. Slicers may be created for one or more columns and for all/portion of the tabular data within a column. For example, a user may select one or more columns (all/portion of the column) of tabular data for which they would like to use slicers (e.g. from a spreadsheet and/or from some other file/data source). In response to the selection, slicer elements are created for each unique value within each of the selected portions for each of the selected columns. The slicers may also be automatically generated (e.g. generate slicers for each column of tabular data). Selection of a slicer element filters the associated tabular data and updates a display of the other slicers. For example, selection of a slicer element may cause another slicer and/or slicer elements to be removed from the display or shown differently (e.g. greyed out) since that slicer does not have any data to filter after the selection of the slicer. Interaction with the slicers may also update other user interface controls that filter the tabular data (e.g. selecting a slicer element changes a value of a filtering setting in a drop down menu and/or selecting the filtering setting in the drop down menu changes a state of a slicer element). A slicer element may be associated with other objects in the spreadsheet and/or included within one or more functions of a spreadsheet. Slicers may be configured to filter/not filter hidden rows of a spreadsheet. Slicers may be configured to filter by hiding rows in the spreadsheet and/or by changing the query causing less data to be returned from the data source to the spreadsheet. Additional details regarding the operation of slicer manager 26 will be provided below.

Figure 2:
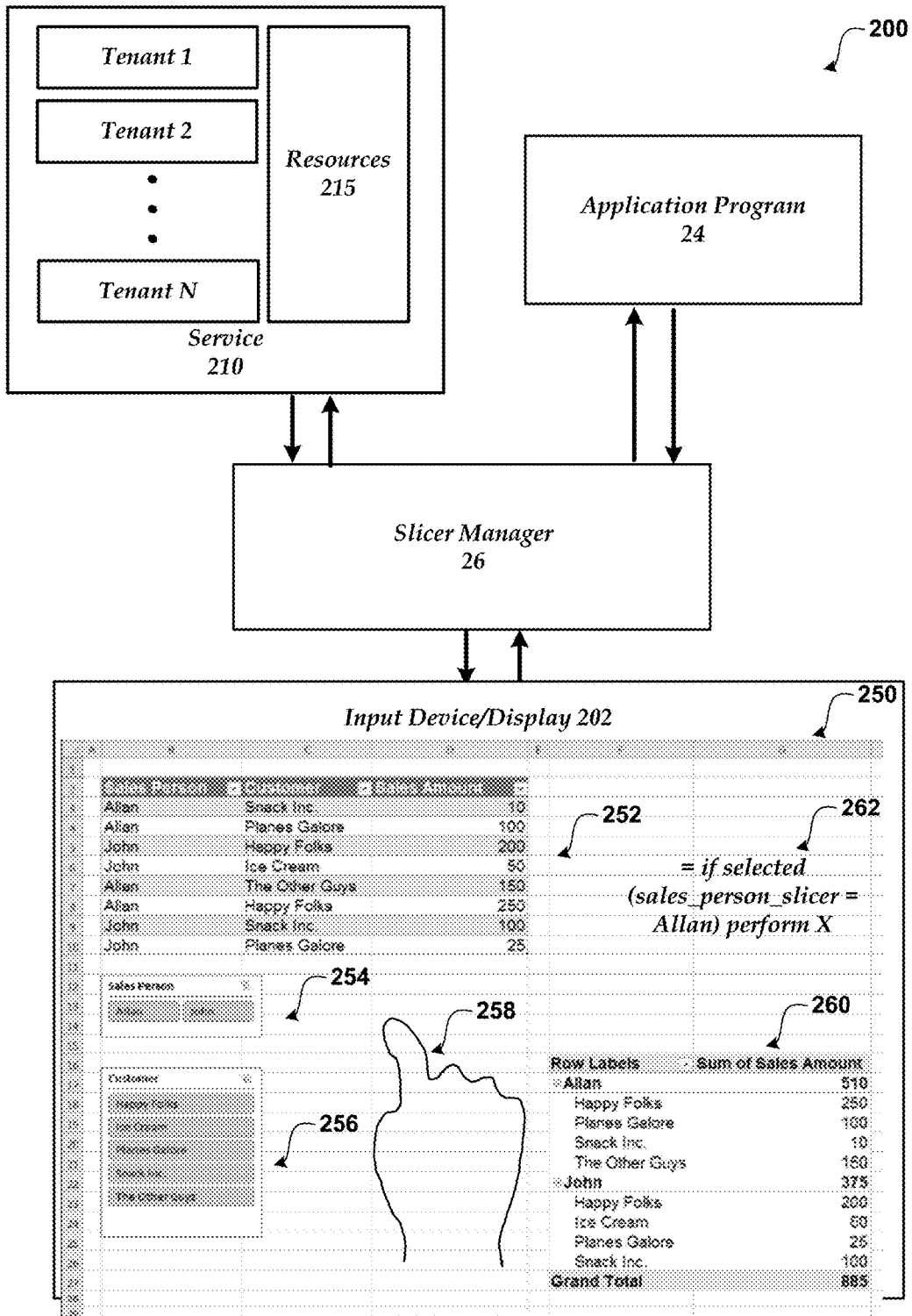
FIG. 2 illustrates an exemplary system using slicer elements for filtering tabular data.

FIG. 2 illustrates an exemplary system using slicer elements for filtering tabular data. As illustrated, system 200 includes application program 24, service 210, slicer manager 26, and input device/display 202. According to an embodiment, display 202 is a touch screen device.

According to one embodiment, application program 24 is a spreadsheet application that is configured to receive input from a touch-sensitive input device 202. For example, slicer manager 26 may provide information to application 24 and/or service 210 in response to a user's finger (i.e. finger on hand 258) selection of a slicer element (e.g. slicer elements in slicer 254 and/or slicer 256), selection of one or more cells of a spreadsheet (e.g. spreadsheet 250), selection of a column/row in a table (e.g. table 252), and the like.

As illustrated, service 210 is a cloud based and/or enterprise based service that is configured to provide services relating to one or more productivity applications (e.g. MICROSOFT EXCEL, MICROSOFT SHAREPOINT, MICROSOFT WORD). Service 210 may also be configured as a client based application. Although system 200 shows a productivity service and/or a content management service, other services/applications may be configured to use slicers with tabular data.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data. For example, service 210 may be configured to provide services corresponding to productivity applications (e.g. content management, word processing, spreadsheet, presentation, messaging . . . ), and the like.

Touch input system 200 as illustrated comprises a touch screen input device 202 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Slicer manager 26 is configured to process the received touch input from touch screen 202. For example, a user may select one or more columns within table 252 (or another column within spreadsheet 252 comprising data) to create slicers. In the current example, a user has used their hand 259 to identify a selection of the sales person column and the customer column for which to create slicers.

In response to the selections, slicer 254 is created for the sales person column and slicer 256 is created for the customer column. Each slicer maps to a column of data and includes slicer elements for each unique value that is within the associated column for the slicer. For example, the sales person column includes two unique values (Allan and John) and the customer column includes five unique values (Snack Inc.; Planes Galore, Happy Folks, Ice Cream, and the Other Guys).

The slicer elements within each of the slicers are configured to filter the tabular data. In the current example, each of the columns within table 252 includes another user interface (UI) element for filtering values within the table (e.g. the dropdowns next to each of the columns). The slicer elements reflect the current filter state of the column.

Table 260 is created to display filtering of the tabular data using the slicer elements. According to another embodiment, selection of the slicer elements may directly change the display of the tabular data (in this case table 252). In the current example, the user has selected the "John" slicer element. In response to the selection of the "John" slicer element it is highlighted to show selection and "The Other Guys" slicer element in slicer 256 is greyed out to indicate that "The Other Guys" slicer element does not have any data to filter for "John." Table 260 shows the data related to the selection of the "John" slicer element and does not show data relating to Allan.

Slicers may be created for one or more columns and for all/portion of the tabular data within a column. For example, a user may select one or more columns (all/portion of the column) of tabular data for which they would like to use slicers. In response to the selection, slicer elements are created for each unique value within each of the selected portions for each of the selected columns. The slicers may also be automatically generated (e.g. generate slicers for each column of tabular data). Selection of a slicer element filters the associated tabular data and updates a display of the other slicers. For example, selection of a slicer element may cause another slicer and/or slicer element(s) to be removed from the display or shown differently (e.g. greyed out) since that slicer does not have any data to filter after the selection of the slicer. Interaction with the slicers may also update other user interface controls that filter the tabular data (e.g. selecting a slicer element changes a value of a filtering setting in a drop down menu and/or selecting the filtering setting in the drop down menu changes a state of a slicer element). A slicer element may be associated with other objects in the spreadsheet and/or included within one or more functions of a spreadsheet. Slicers may be configured to filter/not filter hidden rows of a spreadsheet. Slicers may be configured to filter by hiding rows in the spreadsheet and/or by changing the query causing less data to be returned from the data source to the spreadsheet.

The slicers can be displayed in a variety of different locations. According to an embodiment, the slicers may be placed/moved by a user and/or configured using a layout. For example, a user may drag either or both of the slicers (254, 256) to another screen location. The slicers may also be predefined (e.g. left side, right side, top, bottom). Slicers may also be automatically/manually hidden and displayed and/or repositioned. Logic in the spreadsheet may specify that when a cell/table is selected that has an associated slicer to display the slicer and when the cell/table is not selected the slicer is not displayed. For example, a user may include a function within the spreadsheet that specifies that when any cell within table 252 is hovered over and/or selected to display slicer_salesperson and slicer_customer. Function 262 in cell F5 shows an example function that performs operation X when the slicer element Allan is selected within the Sales Person slicer.

Figure 3:
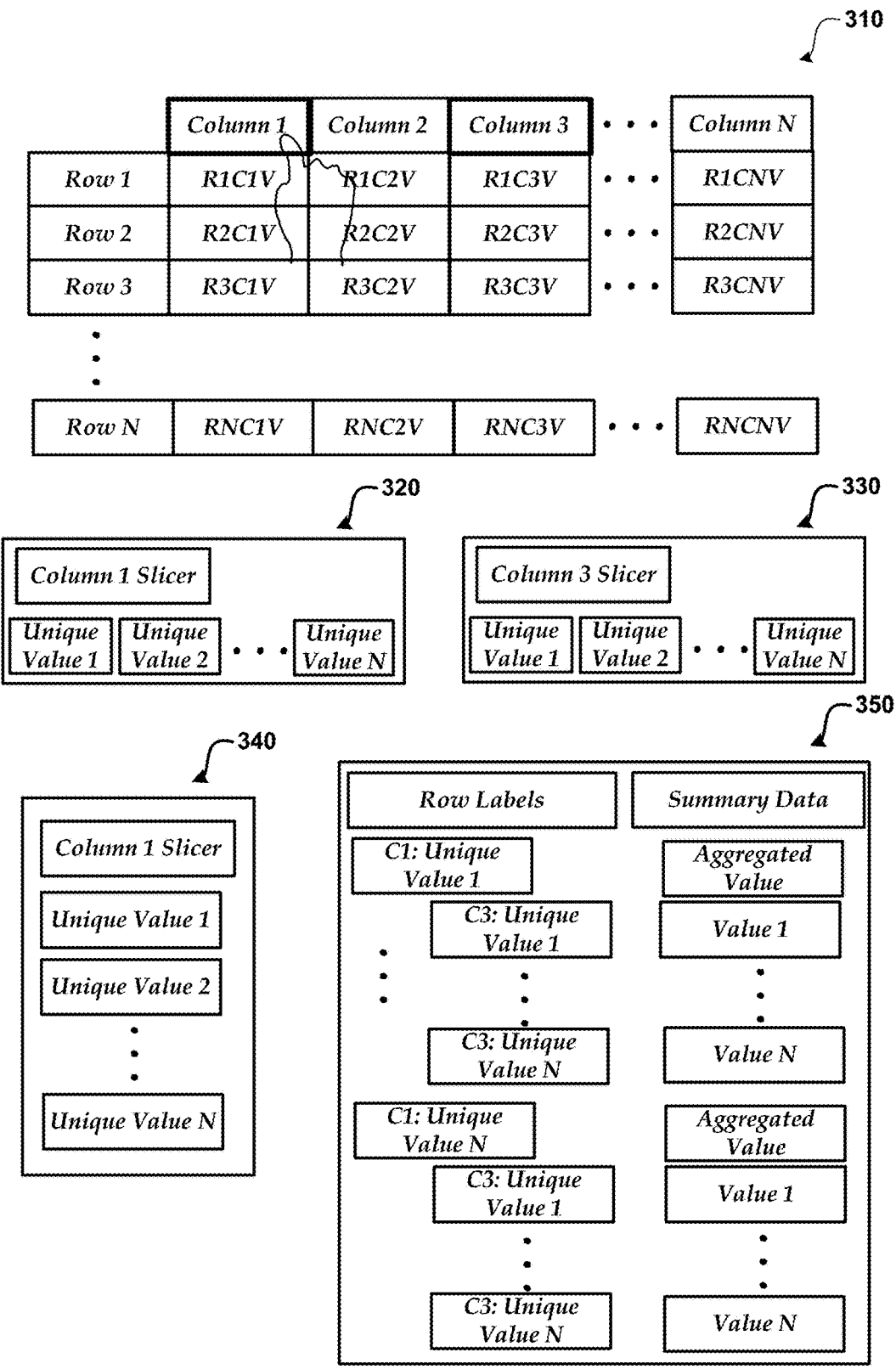
FIG. 3 shows an exemplary display of tabular data for which slicers are configured for filtering.

FIG. 3 shows an exemplary display of tabular data for which slicers are configured for filtering.

As illustrated, display 310 shows N rows and columns of tabular data. Any number of rows and columns of tabular data may use slicer elements (e.g. two, three, ten, twenty . . . ). In the current example, a user has selected column 1 and column 3 of the tabular data to associate with slicers. According to an embodiment, an entire column of tabular data is associated with a slicer. According to another embodiment, a slicer may be associated with a portion of the column (e.g. a user may select fifty cells of the two hundred cells within the column).

In response to the selection of column 1 and column 3 of the tabular data, slicer 320 is created for column 1 and slicer 330 is created for column 3. According to an embodiment, each slicer includes a slicer element for each unique value within the selected column. According to another embodiment, slicer elements are created based on other criteria (e.g. a slicer element for ranges of values, a slicer element for each unique value that occurs more than a predetermined number of times, and the like). A user may configure the display of the slicers using different layouts. For example, slicers 320 and 330 are displayed with the slicer elements displayed horizontally in a row, whereas slicer element 340 shows the slicer elements displayed vertically in different rows. The slicers may be configured by a user to filter non-hidden data and/or hidden data (e.g. a row/column of tabular data 310 is hidden). Slicers may be configured to filter by hiding rows in the spreadsheet and/or by changing the query causing less data to be returned from the data source to the spreadsheet.

Display 350 shows the filtered tabular data in response to selection of slicer elements. Display 350 may be created automatically in response to the creation of the slicers and/or manually laid out by a user. For example, a user may specify where to display the different values. In response to the selection/de-selection of the slicer elements, display 350 changes (See FIGS. 4-8 for exemplary displays). As discussed above, selection of a slicer element can also change a display of other slicer elements. For example, a selection of one slicer element may cause another slicer element to change its display characteristics (e.g. grey out, change font, change color, be removed from display, and the like).

The slicers and associated slicer elements are updated in response to a change to associated tabular data. For example, when a column is deleted that has an associated slicer, the slicer may/may not be deleted. According to an embodiment, the slicer is not deleted, so that the slicer and its values are still there and so can be used by different columns, formulas, pivottables, or other objects in the spreadsheet. When a unique value is removed from a column of data having an associated slicer, the slicer element corresponding to the deleted unique value may/may not be removed. According to an embodiment, deleted items are retained such that if they ever show up again in the data, they can have the same filter state as when they last appeared. Changing a header cell of the tabular data changes a caption of the slicer without deleting the slicer. Similarly, changing a unique name within the column, may change a name of the slicer element. According to an embodiment, a new slicer element is added and the old slicer element that is affected by the change is retained but hidden. According to an embodiment, the slicers are updated as changes occur to the tabular data. The changes may occur in response to selecting/de-selecting a slicer element and/or through other filtering of the tabular data (e.g. auto-filtering of the tabular data, selecting a different UI filtering option, executing a function that changes data within the tabular data and the like). According to an embodiment, the filtering is performed using the filtering functionality provided by the application. For example, selection of a slicer element may create a function call to filter based on a value of the slicer element (e.g. show only values within table 350 that include a specified value).

FIGS. 4-8 show exemplary displays using slicers to filter tabular data. FIGS. 4-8 are illustrated for explanatory purposes and are not intended to be limiting.

Figure 4:
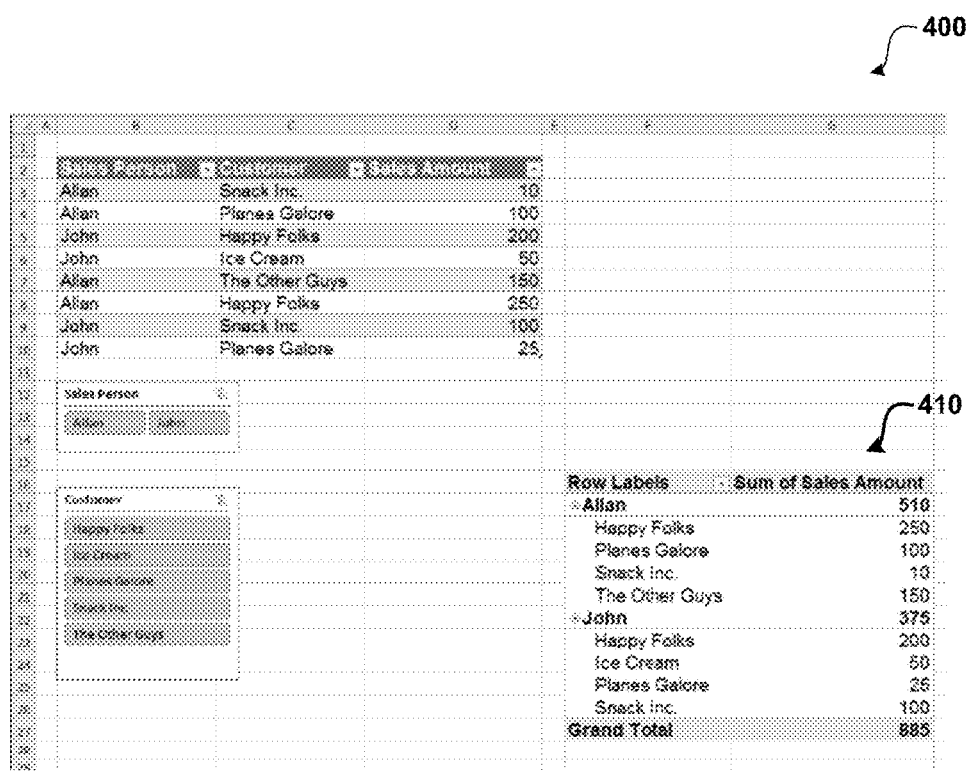
FIGS. 4-8 show exemplary displays using slicers to filter tabular data.

FIG. 4 illustrates tabular data 400 having a column of data that corresponds to a sales person a column of data that corresponds to customers and a column of data that corresponds to sale amounts.

In display 400, a slicer has been created for the sales person column and a slicer has been created for the customer column. The sales_person_slicer includes slicer elements: Allan and John. The customer_slicer includes slicer elements: Happy Folks, Planes Galore, Ice Cream, Snack Inc., and The Other Guys.

Display 400 shows that each slicer element is selected. Table 410 shows the tabular data arranged in a table and filtered based on the selection of the slicer elements.

Figure 5:
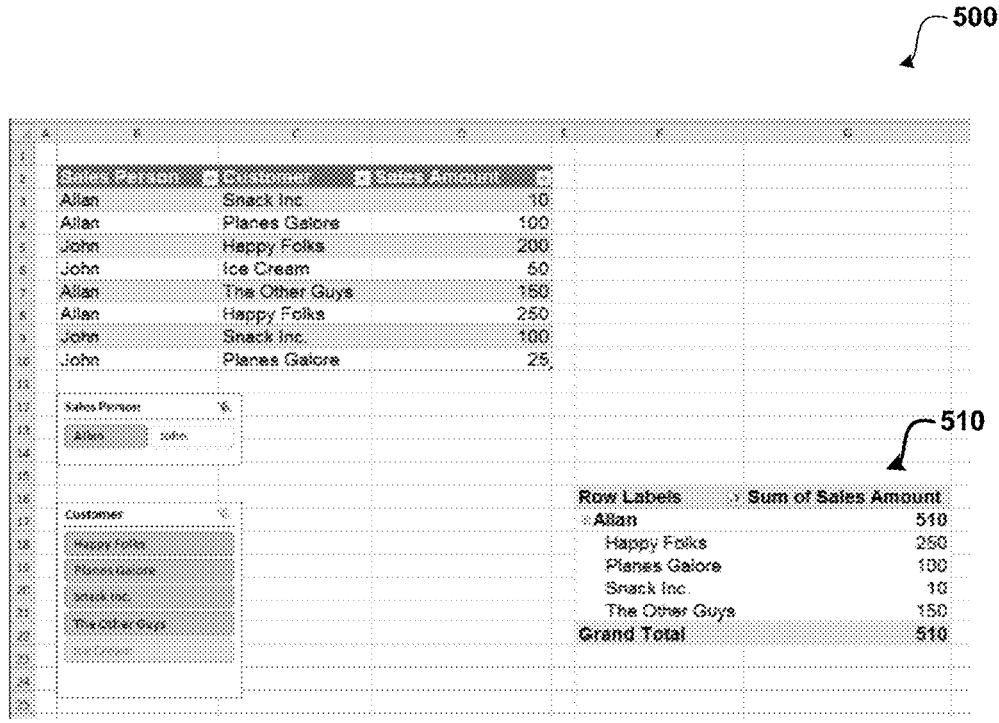

FIG. 5 shows the de-selection of the John slicer element in the sales_person_slicer. As a result of the de-selection, table 510 shows the tabular data relating to the selected slicer element "Allan". In response to the selection of Allan, the Ice Cream slicer element has been greyed out to show that Allan does not have any data that is associated with the Ice Cream slicer element. According to an embodiment, a slicer element that does not have any data to be filtered may be removed from the display.

Figure 6:
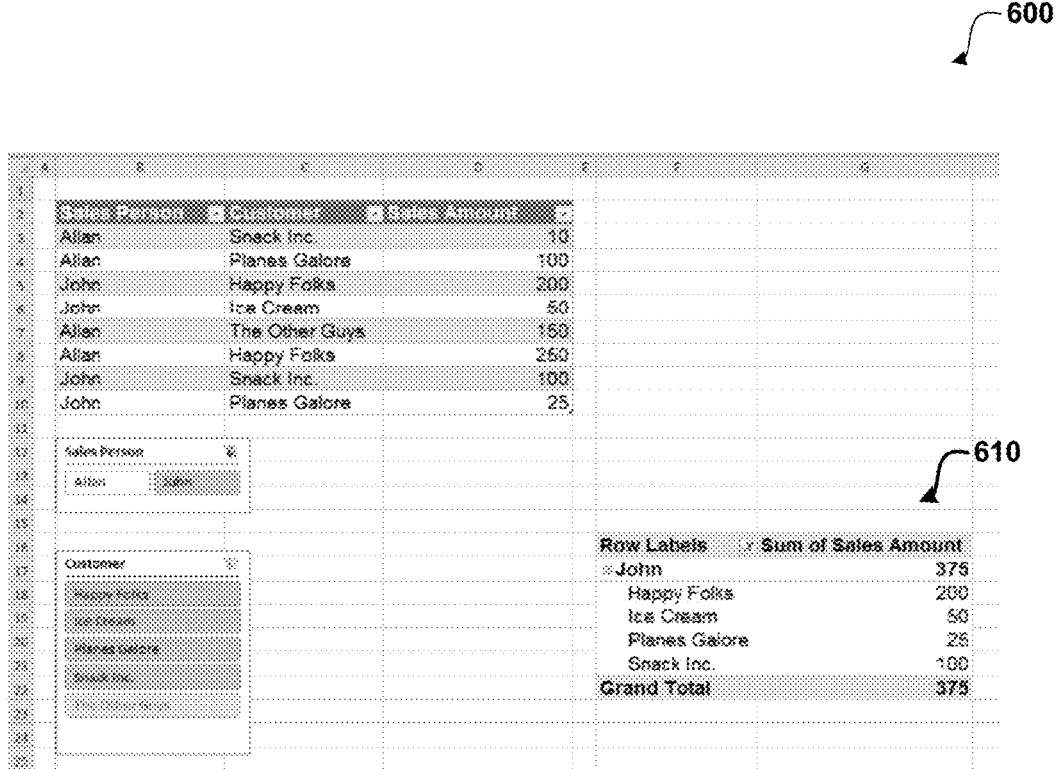

FIG. 6 shows the de-selection of the Allan slicer element and the selection of the John slicer element in the sales_person_slicer. As a result of the de-selection and selection, table 610 shows the tabular data relating to the selected slicer element "John". In response to the selection of John, The Other Guys slicer element has been greyed out to show that John does not have any data that is associated with The Other Guys slicer element.

Figure 7:
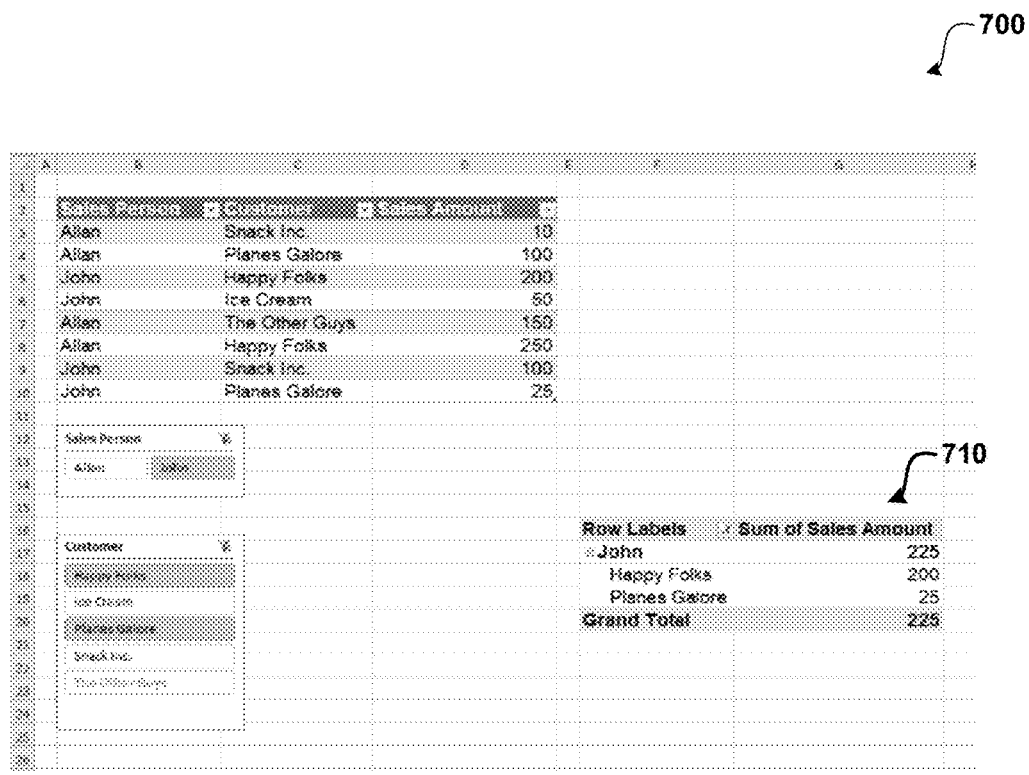

FIG. 7 shows the John slicer element selected and the selection of the Happy Folks slicer element and the Planes Galore slicer element in the customer_slicer. As a result of the selection, table 710 shows the tabular data relating to the selected slicer element "John" from the sales_person_slicer and the selection of the Happy Folks slicer element and the Planes Galore slicer element from the customer_slicer.

Figure 8:
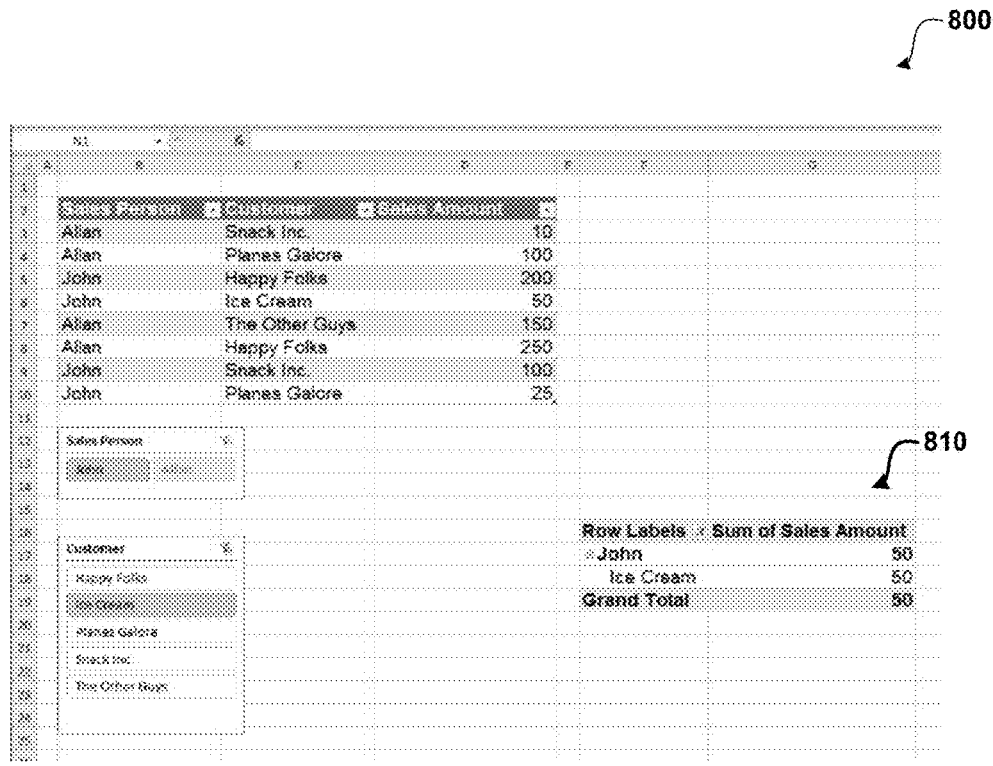

FIG. 8 shows the John slicer element selected and the selection of the Ice Cream slicer element in the customer_slicer. As a result of the selection, table 810 shows the tabular data relating to the selected slicer element "John" from the sales_person_slicer and the selection of the Ice Cream slicer element from the customer_slicer.

Figure 9:
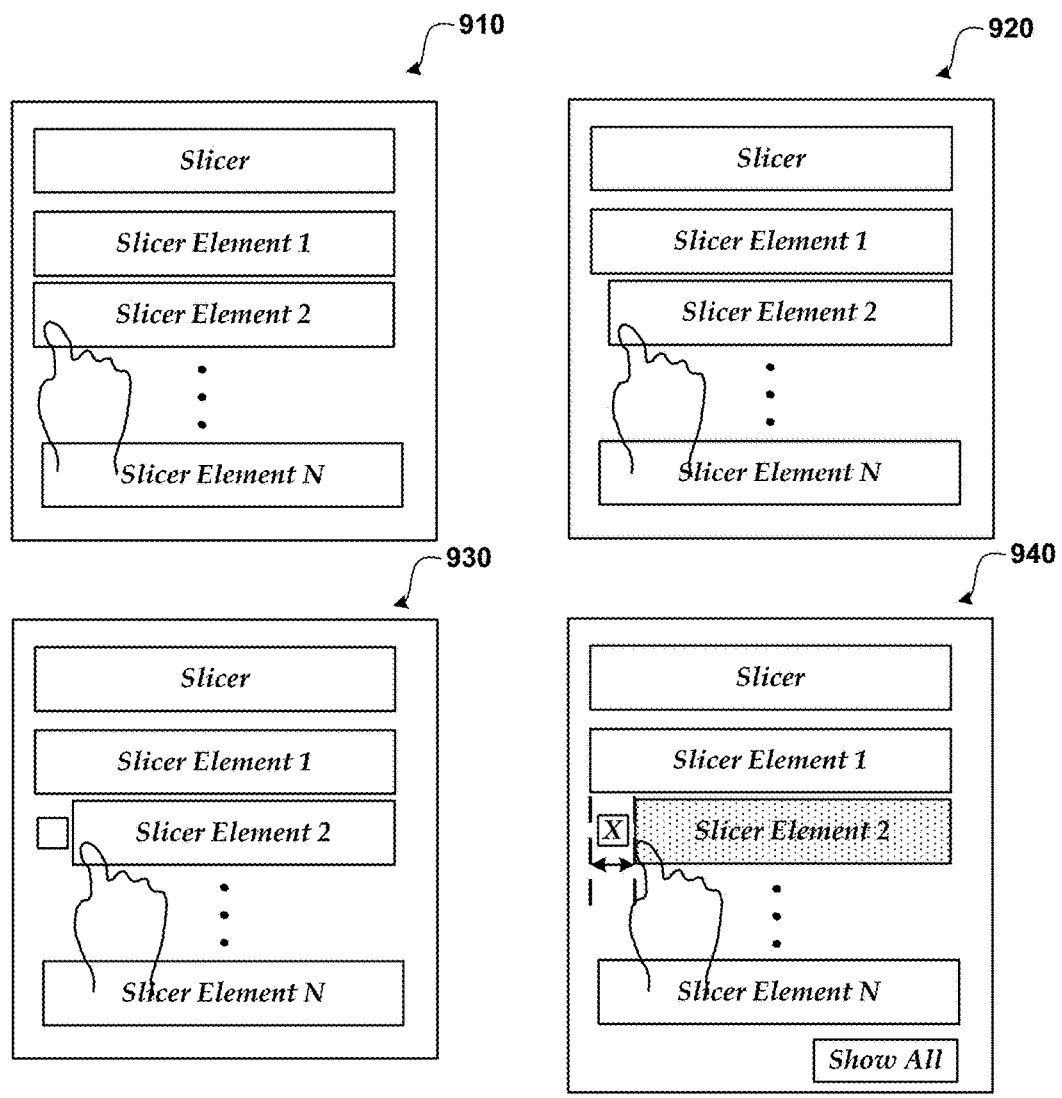
FIG. 9 shows a touch gesture for selecting a slicer element.

FIG. 9 shows a touch gesture for selecting a slicer element. As illustrated, the displays show a selection of Slicer Element 2.

Display 910 shows a slicer and slicer elements. A user has positioned a finger near/on Slicer Element 2 to begin the selection gesture.

Display 920 shows the user dragging an edge of the slicer element (Slicer Element 2) to the right. According to an embodiment, the slicer element is selected after dragging an edge of the slicer a predetermined distance. When the edge is not moved the predetermined distance, the slicer is not selected. According to an embodiment, the slicer may be selected/deselected from dragging any edge of the slicer.

Display 930 shows the user dragging the edge farther toward the middle of the slicer element. According to an embodiment, a checkmark visual appears when the slicer element is slid a predetermined distance but not quite the distance needed to select the slicer element.

Display 940 shows the user dragging the edge of the slicer element the predetermined distance to select the slicer element. According to an embodiment, a checkmark visual that is selected appears in response to the selection. The selected slicer element may also be displayed differently from other slicer elements that are not selected (e.g. changing: a background, a color, a font, highlighting, and the like). Selecting the Show All button selects all of the slicer elements.

Figure 10:
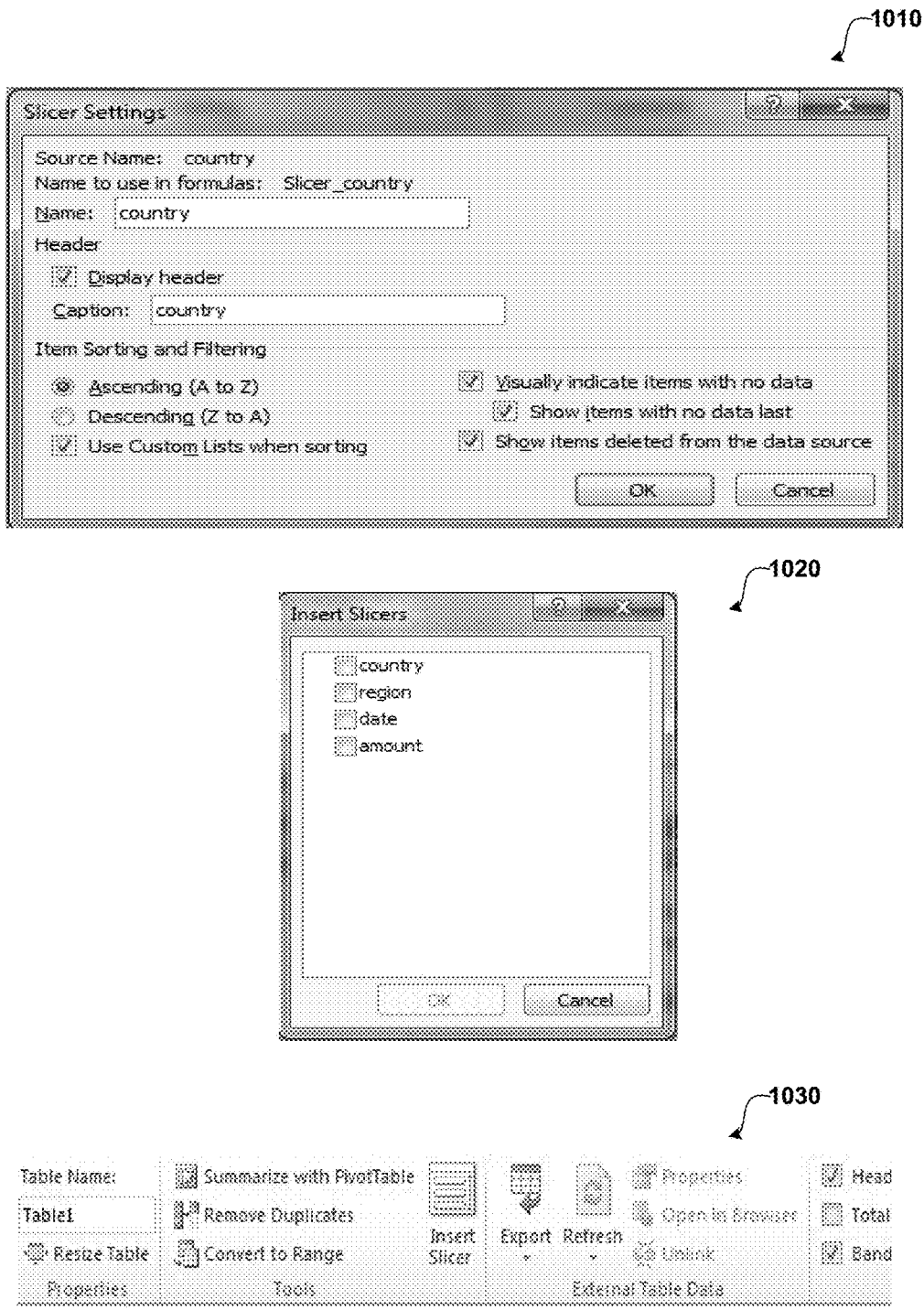
FIG. 10 shows exemplary slicer user interfaces.

FIG. 10 shows exemplary slicer user interfaces.

Display 1010 shows an exemplary slicer settings dialog. The source name is a unique name of the column that the slicer is based on. The name to use in formulas provides a user with a name to be included within zero or more formulas of a spreadsheet. The name field allows a user to change the name of the slicer. The header option allows a user to display a header with a display of slicer elements for a column. The caption is a name that is displayed within the header. The sorting and filtering options provide a user with options to control sort and filtering for the slicer. For example, a user may determine when and how to show slicers/slicer elements that have/do not have data.

Display 1020 shows an exemplary insert slicers dialog. Display 1020 may be used to select the slicers that a user would like to create. For example, display 1020 may initially show a slicer name for each column of tabular data. When a slicer name is selected using the dialog, a slicer is created for the corresponding column of tabular data.

Display 1030 illustrates an exemplary user interface element for inserting a slicer.

Figure 11:
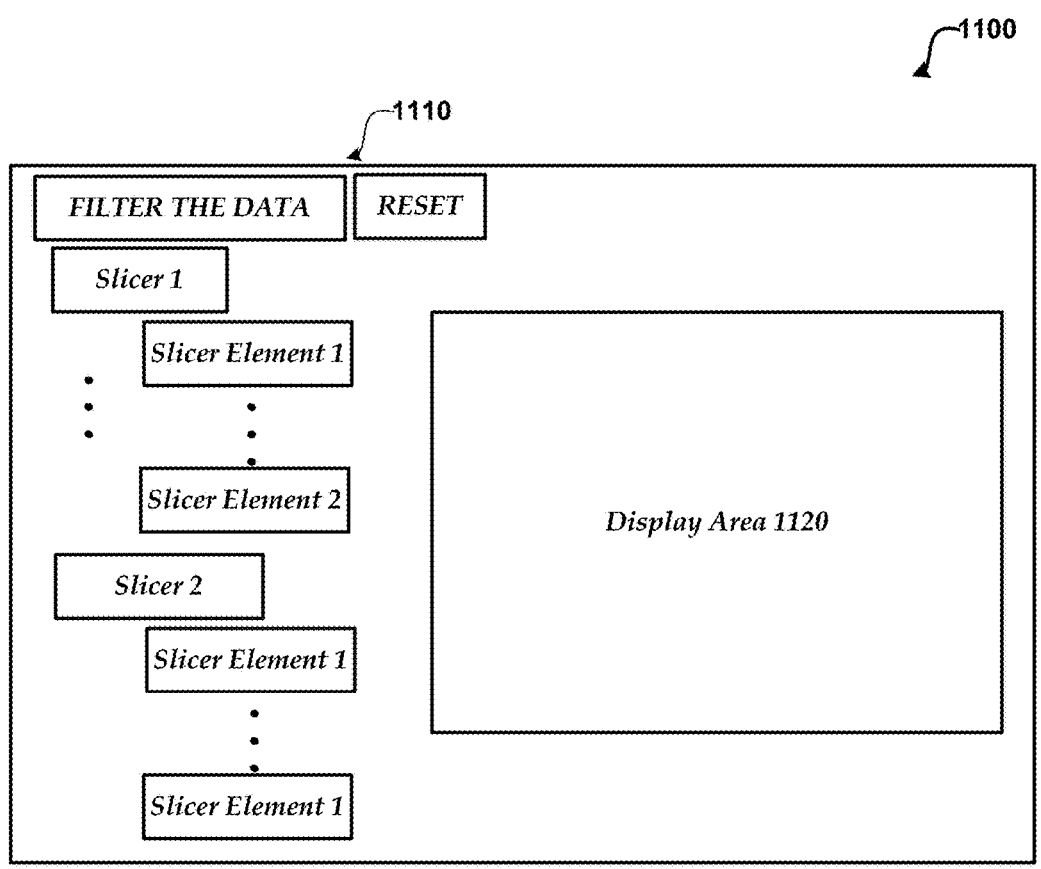
FIG. 11 shows an exemplary display of slicers in a Web based environment.

FIG. 11 shows an exemplary display of slicers in a Web based environment.

Display 1100 may be displayed within a Web browser and/or within an application window. For example, a user may access a spreadsheet service on a tablet device through a Web browser. As illustrated, the slicers 1110 (slicer 1 and slicer 2) are displayed on the left hand side of the screen and allow a user to change the data displayed in display area 1120. The slicers 1110 may be associated with any tabular data (e.g. data from: columns of a spreadsheet; a table; a data feed; and the like).

Figure 12:
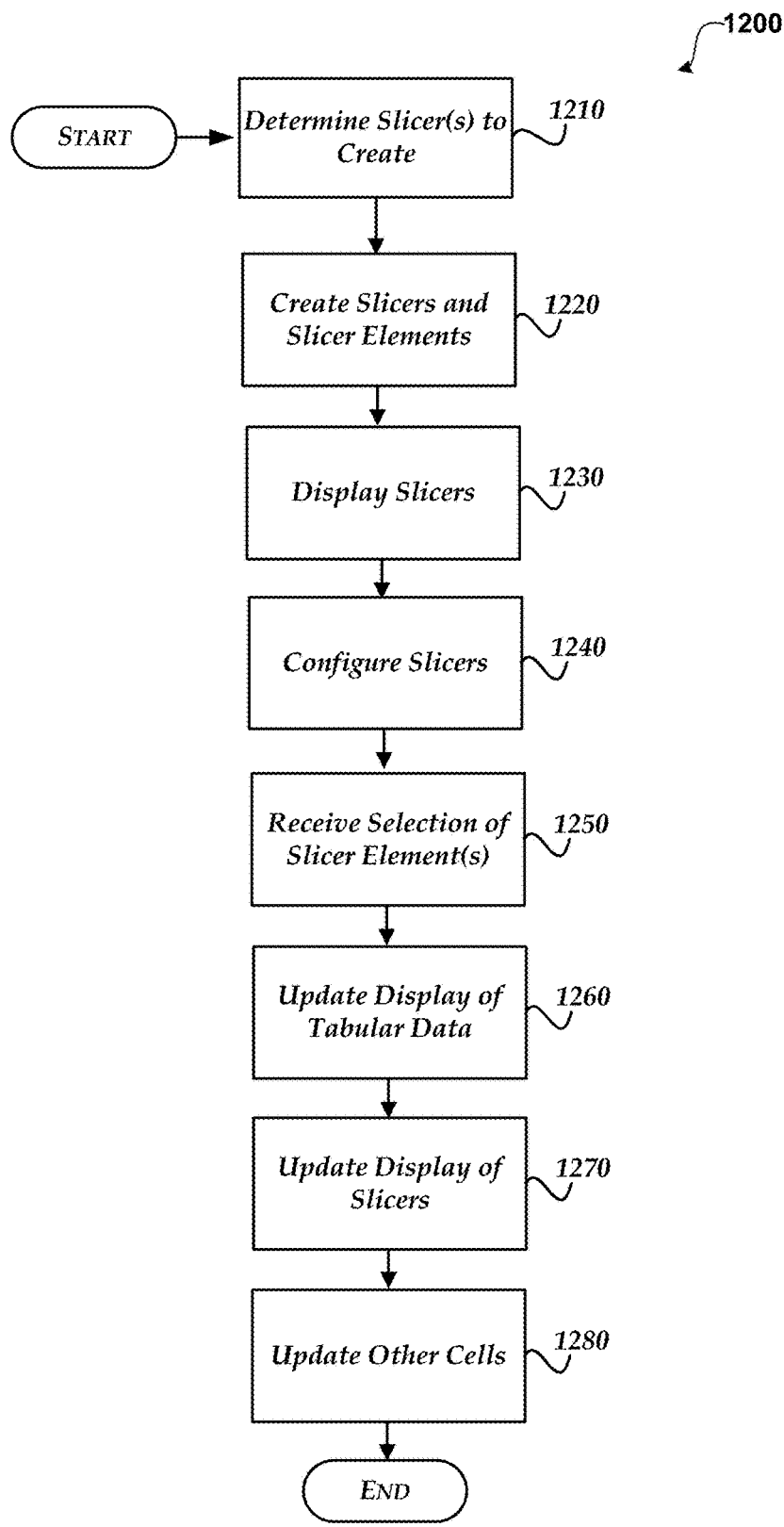
FIG. 12 shows an illustrative process for using slicers to filter tabular data.

Referring now to FIG. 12, an illustrative process for using slicers to filter tabular data will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, process 1200 flows to operation 1210, where a determination is made as to what slicers to create for tabular data. The slicers to create may be automatically/manually determined. For example, a slicer may be created for each column of data. The slicers to create may also be determined from user input. For example, a user may select one or more columns of tabular data. A user may also select a portion of one or more columns of data. According to an embodiment, the selection of the tabular data to associate with slicers uses touch input. For example, a user may perform a gesture to select one or more cells of a spreadsheet. Additionally, according to some embodiments, the user may only have to place their finger (or some other object) near the surface of the touch surface for touch input to be received and detected. The cells may include cells within one or more rows and one or more columns of the spreadsheet. The selection may be used to identify columns to associate with slicers and/or what portion of the column to associate with the slicers. For example, a slicer may be associated with a portion of a column when the entire column is not selected.

Flowing to operation 1220, the slicers and slicer elements are created. A slicer is created for each selected column. Slicer elements are created for each unique value within each of the selected portions for each of the selected columns. According to another embodiment, slicer elements are created based on other criteria (e.g. a slicer element for ranges of values, a slicer element for each unique value that occurs more than a predetermined number of times, and the like).

Transitioning to operation 1230, the slicers are displayed. A user may configure the display of the slicers. For example, the slicers and slicer elements may be shown in separate movable windows/elements, placed at predetermined positions on the display, the slicer elements may be displayed horizontally and/or vertically and the like.

Moving to operation 1240, the slicers are configured. For example, the slicers may be configured by a user to filter non-hidden data and/or hidden data (e.g. a row/column of tabular data that is hidden). Slicers may be configured to filter by hiding rows in the spreadsheet and/or by changing the query causing less data to be returned from the data source to the spreadsheet. According to an embodiment, the slicers may be configured to operate on the tabular data itself and/or a separate display that shows the tabular data as it is filtered within a report type view.

Flowing to operation 1250, a selection of slicer element(s) is received. Zero or more of the slicer elements from one or more of the slicers may be selected.

Transitioning to operation 1260, the display of the tabular data is updated in response to the selections of the slicer elements. For example, selection of a slicer element filters the tabular data to include the corresponding values within the display of the tabular data.

Moving to operation 1270, the display of other slicers and slicer elements are updated when determined. For example, a selection of one slicer element may cause another slicer element to change its display characteristics (e.g. grey out, change font, change color, be removed from display, and the like). Changing the display characteristics allows a user to see an effect of the filtering caused by the selection of the slicer element(s). According to an embodiment, the slicers are updated automatically. The slicers may be manually/automatically turned off. According to an embodiment, the automatic updates of slicers are automatically turned off in response to and updates of the slicers taking a predetermined period of time to complete (e.g. longer than 300 ms). Other predetermined period times may be configured (e.g. 200 ms, 350 ms, 400 ms, 500 ms, 1 second, and the like). For example, a user may specify a time period using a UI. Updating a large number of slicer elements may take a long time and may affect other operations in the application (e.g. calculation time). The automatic updates may be turned back on automatically/manually. For example, a user may turn them back on through a UI (e.g. after they have made various edits and are ready to start analyzing the data again via the slicers). According to an embodiment, the slicers/slicer elements are rendered differently when they are not being automatically updated.

Flowing to operation 1280, other cells that reference the slicer and/or slicer element are updated. A slicer/slicer element may be included within one or more cells of a spreadsheet, a cell inside another table, pivottable, it could be feeding a chart, or within any other spreadsheet object. When a slicer is selected, the cells referencing the slicer are informed.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system comprising at least one processor operatively coupled to at least one computer storage device, the computer storage device having computer-executable instructions configured for:
   displaying slicer elements associated with tabular data, wherein the tabular data does not include a pivot table and the slicer elements comprise a first slicer element and a second slicer element;
   receiving a selection of the first slicer element;
   based on the selection of the first slicer element, automatically updating a display of the tabular data to only display the tabular data associated with the first slicer element; and
   based on a change to the tabular data, automatically updating the display of the slicer elements based on the change to the tabular data.

2. The system of claim 1, wherein receiving the selection of the first slicer element comprises one of:
   receiving a touch input to the first slicer element; or
   hovering over the first slicer element.

3. The system of claim 1, wherein automatically updating the display of the tabular data comprises automatically hiding one or more rows of displayed tabular data that is associated with the second slicer element.

4. The system of claim 1, wherein displaying the slicer elements comprises displaying a first slicer and associated two or more slicer elements separately from a second slicer and associated two or more slicer elements, wherein the two or more slicer elements associated with the first slicer include the first slicer element and the two or more slicer elements associated with the second slicer include the second slicer element.

5. The system of claim 1, wherein receiving the selection of the first slicer element occurs at a client computing device.

6. The system of claim 1, further comprising defining a slicer element in the slicer elements as an object within a spreadsheet that is referenced by a user-defined function.

7. The system of claim 1, further comprising filtering the tabular data in response to the selection of the first slicer element, wherein the filtering of the tabular data is configurable to filter hidden tabular data within a spreadsheet; non-hidden data within the spreadsheet; and a query associated with the filter.

8. A computer implemented method comprising:
   displaying slicer elements associated with tabular data, wherein the tabular data does not include a pivot table;
   receiving a selection of at least one slicer element;
   based on the selection of the at least one slicer element, updating a display of the tabular data to only display the tabular data associated with the at least one slicer element; and
   based on a change to the tabular data, automatically updating the display of the slicer elements based on the change to the tabular data, wherein updating the display comprises at least one of:
   stop displaying a slicer element associated with data deleted from the tabular data; or
   adding a new slicer element based on an addition of data to the tabular data.

9. The method of claim 8, wherein receiving the selection of each slicer element comprises at least one of:
   receiving a touch input to a slicer element; or
   hovering over a slicer element.

10. The method of claim 8, wherein updating the display of the tabular data comprises hiding one or more rows of displayed tabular data that is associated with the one or more slicer elements.

11. The method of claim 8, wherein displaying the slicer elements comprises displaying a first slicer and associated slicer elements separately from a second slicer and associated slicer elements.

12. The method of claim 8, wherein receiving the selection of the at least one slicer element occurs at a client computing device.

13. A computer implemented method comprising:
    generating slicer elements associated with tabular data, wherein the tabular data does not include a pivot table and the slicer elements comprise a first slicer element and a second slicer element;
    displaying the slicer elements;
    receiving a selection of the first slicer element;
    based on the selection of the first slicer element, updating a display of the tabular data to only display the tabular data associated with the first slicer element; and
    based on a change to the tabular data, automatically updating the display of the slicer elements based on the change to the tabular data, wherein updating the display comprises at least one of:
    based on a deletion of data from the tabular data, stop displaying a slicer element associated with the deleted data;
    based on a modification to data in the tabular data, modifying a slicer element associated with the modified data; or
    based on an addition of data to the tabular data, adding a new slicer element.

14. The method of claim 13, wherein receiving the selection of the first slicer element comprises at least one of:
    receiving a touch input to the first slicer element; or
    hovering over the first slicer element.

15. The method of claim 13, further comprising updating the display of the tabular data by hiding one or more rows of displayed tabular data that is associated with the second slicer element.

16. The method of claim 13, wherein displaying the slicer elements comprises displaying a first slicer separately from a second slicer, wherein the first slicer element is associated with the first slicer and the second slicer element is associated with the second slicer.

17. A hardware-device storing instructions that, when executed, cause at least one processor to execute a method, the method comprising:

generating slicer elements associated with tabular data, wherein the tabular data does not include a pivot table;

displaying the slicer elements;

receiving a selection of a first slicer element;

based on the selection of the first slicer element, automatically filtering the tabular data based on the selection of the first slicer element;

based on the automatic filtering, automatically updating a display of the tabular data to only display the tabular data associated with the first slicer element; and based on a change to the tabular data, automatically updating the display of the slicer elements based on the change to the tabular data.

18. The hardware-device of claim 17, wherein updating the display of the tabular data comprises hiding one or more rows of displayed tabular data that is associated with a second slicer element.

* * * * *